Oct. 6, 1953
H. A. HECKENDORF
2,654,536
POWER WASHING CREAM SEPARATOR
Filed July 12, 1951
2 Sheets-Sheet 1
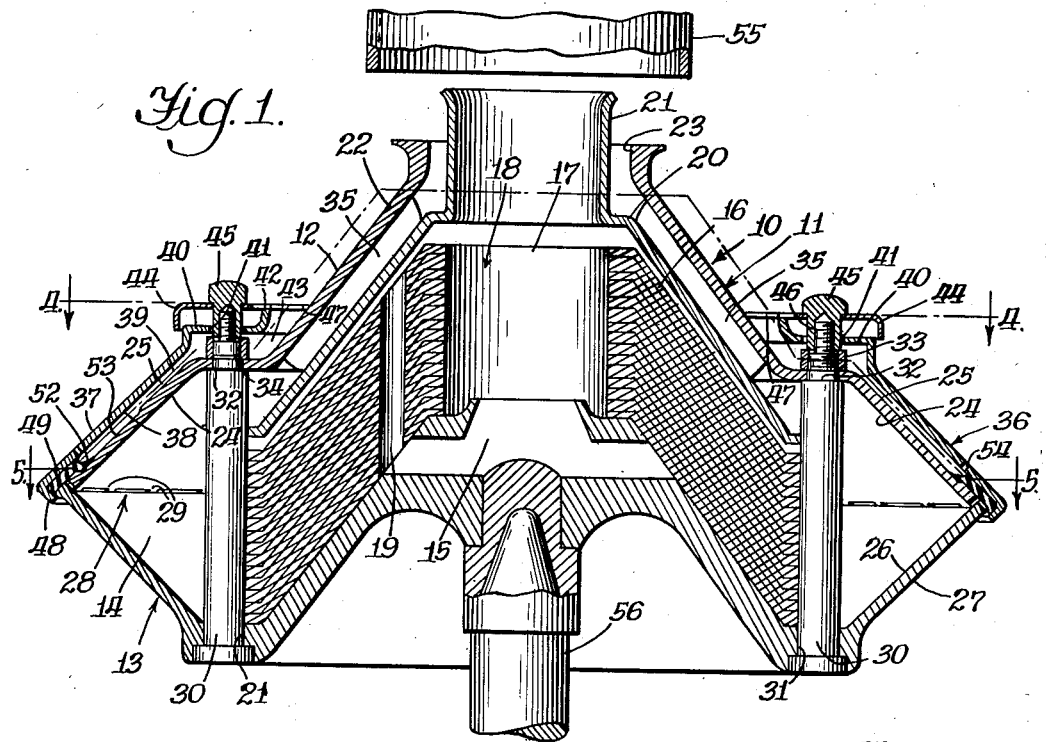
Fig. 1.
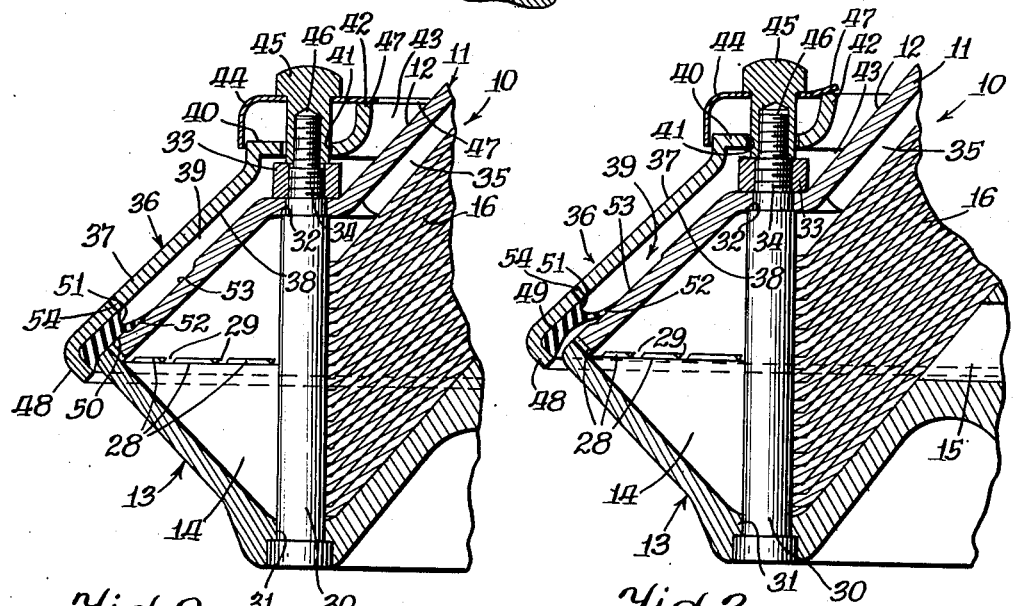
Fig. 2.
Fig. 3.
Inventor.
Howard A. Heckendorf
Paul O. Pippel
Atty.

Oct. 6, 1953

H. A. HECKENDORF 2,654,536

POWER WASHING CREAM SEPARATOR

Filed July 12, 1951

Inventor:
Howard A. Heckendorff
Paul O. Pippel
Atty.

Patented Oct. 6, 1953

2,654,536

UNITED STATES PATENT OFFICE 2,654,536

POWER WASHING CREAM SEPARATOR

Howard A. Heckendorf, Chicago, Ill., assignor to International Harvester Company, a corporation of New Jersey Application July 12, 1951, Serial No. 236,413

10 Claims. (Cl. 233—20)

This invention relates to a centrifugal separator. More specifically, it relates to a cream separating bowl having an improved construction for automatically washing and flushing the bowl after the cream separating operation has been completed.

The W. H. Harstick Patent 2,504,261, patented April 18, 1950, discloses a cream separating bowl having provisions whereby the bowl may be washed and flushed clean after the separating operation. In the type of construction disclosed in this patent a substantially continuous peripheral discharge opening is regulated by an annular valve ring which is effective to close the opening during high speeds of rotation of the bowl, the valve being resilient to open during a change in speed of rotation whereby flushing liquid can be discharged through the discharge opening. In a device of this type it is necessary to change the speeds of rotation of the bowl to effectuate movement at the valve ring. This function can, of course, be accomplished in a number of ways and the separating bowl shown in the patent is so designed that upon the entrance of a large quantity of washing liquid into the separating bowl, the speed of rotation is lowered appreciably, the valve ring contracts and the washing liquid can then be flushed through the discharge opening. It is a prime object of this invention to provide a separating bowl which will accomplish a similar function as the bowl shown in the above patent, the improvement further residing in a complete automatic operating bowl wherein the valve structure for the peripheral discharge opening may be opened and closed while maintaining a constant speed of rotation of the separating bowl.

A still further object is to provide a power washing separating bowl having a valve operable to open and close a peripheral discharge opening in the bowl, the valve being actuated by hydrostatic pressure developed within a chamber positioned exteriorly of the bowl.

Still another object is the provision of a power washing separating bowl, the bowl including an annular valve shell which is positioned exteriorly of the bowl, the valve shell having an annular sealing element bonded thereto, the sealing element normally being in sealing engagement with a peripheral discharge opening. The valve shell forms with the exterior surface of the bowl a pressure chamber in which sufficient liquid pressure may be developed to effect axial movement of the shell thereby disengaging the valve element from sealing relation with respect to a discharge opening.

A still further object is the provision of an improved valve construction for regulating the peripheral discharge opening of a power washing cream separator, the valve construction including a valve element which is normally in sealing engagement with the discharge opening and a spring support for rotation with the bowl, the spring being in engagement with the valve element for urging the sealing element into sealing relation with respect to the discharge opening.

A still further object is the provision of an improved sealing element used in the valve construction of a power washing cream separating bowl, the sealing element being of annular shape and having an inner annular concave edge provided with an annular web portion which is adapted to engage the exterior surface of a power washing bowl to form with said surface a pressure chamber in which hydrostatic pressure is developed for effecting movement of the valve structure and for permitting the discharge of liquid through the discharge opening.

These and further objects will become more readily apparent from a reading of the specification when examined in connection with the accompanying sheets of the drawings.

In the drawings:

Figure 1 is a cross-sectional view in elevation through a power washing cream separating bowl.

Figure 2 is an enlarged sectional view of a portion of the cream separating bowl shown in Figure 1, the view showing a valve structure in a first operating position.

Figure 3 is an enlarged sectional view of a portion of a cream separating bowl, the view being similar to Figure 2 but showing a valve element on the bowl in a second operating position.

Figure 4:
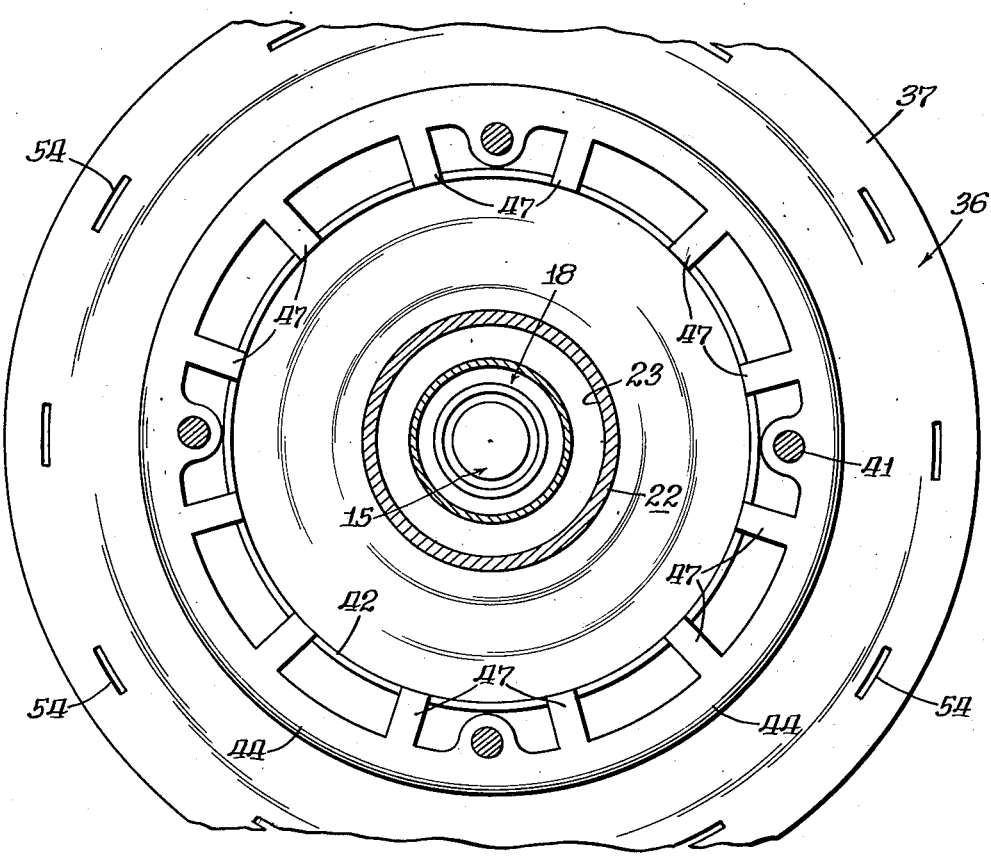
Figure 4 is a sectional view through a separating bowl, the view being taken substantially along the line 4—4 of Figure 1.

Referring now particularly to Figures 1, 2 and 3, a centrifugal separator is generally designated by the reference character 10. The separator 10 comprises a separating bowl 11 having an upper bowl portion 12 and a lower bowl portion 13. The separating bowl 11 is provided with a separating chamber 14 which has at its lower end a distributing chamber 15. A plurality of frusto-conical separating disks 16 are positioned in the bowl in conventional superposed relation.

The separating disks 16 are provided with conventional inner peripheral edges defining inner peripheral openings 17 which are in axial alinement to provide a passage 18. The separating disks are further provided with eccentrically disposed and alined openings 19 which are in communication with the distributing chamber 15. Immediately above the uppermost disk 16 is a divider disk 20. The divider disk 20 has an upwardly extending tubular inlet 21.

Figure 5:
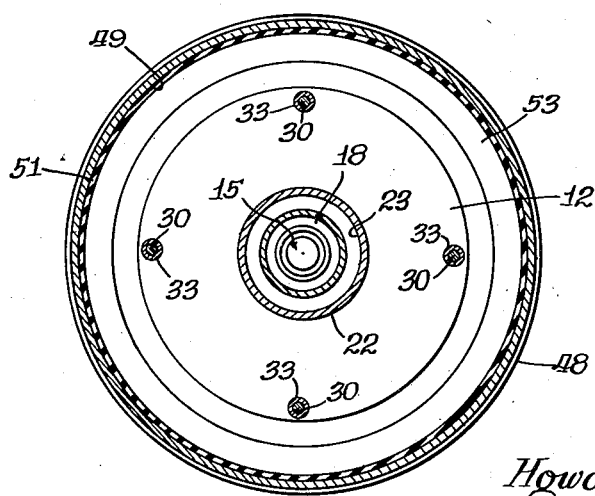
Figure 5 is a cross-sectional view through a cream separating bowl, the view being taken substantially along the line 5—5 of Figure 1.

The upper bowl portion 12 is provided with an upwardly extending tubular throat 22 which is provided with an inlet 23. The upper bowl portion 12 is provided with an inner sloping surface 24 and with an outer sloping surface 25. The lower bowl portion 13 is provided with an inner sloping surface 26 and an outer sloping surface 27, the surfaces 24, 25 and 26, 27 converging toward each other to a maximum internal periphery at which point a substantially continuous opening 28 is provided. As best shown in Figures 1 and 5, the opening 28 may be considered substantially continuous though it is interrupted by circumferentially spaced spacer elements which separate the upper and lower bowl portions 12 and 13 respectively.

The upper and lower bowl portions 12 and 13 are connected together by vertically extending securing pins 30, these pins, as shown in Figure 4, being circumferentially spaced. The securing pins 30 extend through circumferentially spaced bores 31 provided in the lower bowl portion 13. Near the upper end of each pin 30 is provided a shoulder 32 on which the upper bowl portion 12 is seated. A nut 33 is securely threaded on a threaded portion 34 of each securing pin 30, the nut 33 engaging the upper bowl portion 12 and thus firmly connecting the upper and lower bowl portions in assembly.

The inner surface of the throat 22, as shown in Figure 1, is provided with a plurality of inwardly projecting vanes 35. These vanes are circumferentially spaced about the throat 22, only two of these vanes being shown. The vanes 35 engage the divider disks 22 and thus securely hold the separating disks 16 in their axially stacked relation.

A valve structure for regulating the peripheral discharge opening or orifice 28 is designated by the reference character 36. The valve structure 36 comprises an annular shell 37 having an inner surface 38 sloping in the same general direction as the surfaces 24 and 25 of the upper bowl portion 12. The inner surface 38 of the shell 37 is vertically spaced from the upper bowl portion 12 to provide a liquid receiving pressure chamber generally designated at 39. The shell 37 is provided with an inwardly extending flange 40 which is provided with a plurality of circumferentially spaced bores or openings 41 best shown in Figures 1 and 4. The innermost edge of the flange 40 is provided with an annular upwardly extending edge 42 forming an annular opening 43 which encircles the throat 22 of the upper bowl portion 12. The shell 37 is continually urged in an axial downward direction by a spring element 44. The spring element 44 is securely connected to the upper bowl portion 12 by means of a plurality of cap nuts 45 which are securely tightened over a threaded end 46 integral with each of the securing pins 30. As best shown in Figure 4, the spring element 44 is provided with a plurality of spring tabs 47 which extend radially inwardly, are circumferentially spaced, and as best shown in Figures 2 and 3 engage the up-turned peripheral edge 42 of the shell 37 for normally urging the shell in a direction toward the upper bowl portion.

The outermost peripheral edge of the shell 37 is provided with a downwardly extending annular flange 48. An annular sealing element 49 is securely bonded or connected to the underneath side of the shell 37 immediately adjacent the flange 48. The sealing element is of a rubber-like material and has a lower flat sealing surface 50 which, as indicated in Figures 1 and 2, is normally in sealing relation over the continuous annular peripheral discharge opening 28. The downward pressure of the spring element 44 against the shell 37 compresses the sealing element over the discharge opening 28 so that a tight seal is secured. The inner peripheral edge of the sealing element 49 is concavely shaped throughout the length of the sealing element to provide an annular concavity 51 coextensive with said sealing element. An annular web 52 projects inwardly from the sealing element 49, this web being integral with the sealing element and therefore also of flexible rubber-like construction. The web 52 tapers to a feather edge at its inner extremity and is adapted to engage, as best shown in Figures 2 and 3, an annular recess 53 formed in the outer sloping surface 25 of the upper bowl portion 12. Immediately adjacent the sealing element 49 a plurality of circumferentially spaced bleeder orifices or openings 54 are provided in the shell 37 as best shown in Figure 4.

A washing liquid nozzle is indicated at 55, this nozzle having a sufficient diameter to direct washing liquid to the interior of the separating bowl and also to the pressure chamber 39. The bowl 11 may be rotated in a conventional manner by means of a spindle 56 connected to the lower bowl portion as indicated in Figure 1.

*Operation*

The operation of the power washing centrifugal separator 10 is conventional in the separating operation. Liquid to be separated is supplied to the distributing chamber 15 by means of an elongated feed tube (not shown) which is inserted through the passage 18 for delivering liquid directly to the distributing chamber 15. Liquid to be separated is thus supplied to the separating disks through the vertically alined openings 19. The cream which is formed along the inner peripheral edges of the separating disks travels upwardly through the tubular member 21 where it is suitably discharged to a receiving tinware construction not shown. The heavier constituents such as the skim milk travel outwardly to the peripheral edge of the bowl and the liquid travels upwardly in the space formed by the divider disk 20 and the throat 22 where it is discharged through the opening 23 to a cream receiving tinware construction not shown. During the separation of cream, the bowl 10 may be operating at a speed of 14,000 R. P. M. The spring element 44 securely holds the shell 37 in the position shown in Figure 1, whereby the sealing element 49 is securely held against the upper surface 25 of the upper bowl portion thereby effectively sealing the discharge opening 28.

After the separating operation has been completed, it is desired to immediately wash the interior and exterior parts of the separating bowl. It is extremely necessary that the interior parts such as the disks and the separating chamber are efficiently washed without the necessity of disassembling the bowl parts. To accomplish this washing operation, washing liquid is delivered to the separating bowl by means of a nozzle 55. The nozzle 55, as indicated, is of sufficiently large diameter so that the washing liquid is supplied through the tubular member 21 and through the opening 23. Washing liquid also flows down along the exterior portion of the throat 22 whereupon it enters through the annular opening 43 into the pressure chamber 39. Thus it can be seen that washing liquid reaches all of the interior portions of the separating bowl and that a certain quantity of washing liquid is immediately delivered to the pressure chamber 39. The speed of rotation of the separating bowl is substantially maintained during the delivery of washing liquid. As best shown in Figure 3, the washing liquid is trapped in the pressure chamber 39 by means of the inner concavity 51 of the sealing element 49. The outward pressure of the washing liquid against the sealing element 49 causes the web 52 to clamp its annular feather edge downwardly in sealing relation with respect to the annular recess 53. Thus it can be seen that the pressure chamber 39 is securely sealed against the pressure of the liquid which is under centrifugal action. The hydrostatic pressure which builds up in the chamber 39 effects upward movement of the shell 37 against the action of the spring element 34. Thus as shown in Figure 3, the sealing element 49 is displaced completely from the annular opening 28 and washing liquid within the bowl is discharged through the opening, thereby flushing and cleaning all of the inner surfaces of the bowl and the parts contained therein.

The delivery of washing liquid through the nozzle 55 may now be halted and the bleeder openings 55 are effective to discharge predetermined quantities of the washing liquid within the chamber 39. After a predetermined time, most of the liquid in the chamber 39 is discharged through the bleeder openings and the hydrostatic pressure is so reduced that the spring 44 again causes axial movement of the shell 37 to cause sealing engagement of the sealing element 49 with the discharge opening 28. The bowl, the separating disks and other parts have now been completely flushed and the discharge opening is again sealed against the discharge of liquids. To repeat the flushing operation, it is merely necessary to again deliver washing liquid to the interior and exterior parts of the bowl and the cycle of operation can be repeated.

It can now be seen that the effective and positive flushing and washing of the interior portions of the bowl can be accomplished by the sudden release of the valve construction which permits the discharge and flushing of the washing liquid through the discharge opening. The movement of the valve element and shell 37 is occasioned entirely by the pressure developed within the pressure chamber 39. The speed of rotation of the separating bowl may be maintained the same as the speed used in the separating operation, since movement of the valve shell 37 is solely dependent upon the hydrostatic pressure built up within the pressure chamber 39. During the separating operation no pressure is, of course, built up in the pressure chamber since no liquid is delivered thereto. However, during the washing operation, the opening of the valve structure is automatic since upon delivery of washing liquid to the interior and exterior parts of the bowl, the valve element is effective to open the discharge opening to permit the discharge of washing liquid.

Of particular importance is the unique shape of the valve element 49. This valve element is of a resilient construction and permits the sealing of the discharge opening, the inner peripheral shape of the valve element being such that an effective seal is obtained between the upper surface of the upper bowl portion and the shell 37 to effectuate a tight seal for the pressure chamber 39 when the said chamber is filled with washing liquid. As shown in Figure 3, a tight seal is maintained despite the fact that the shell 37 may be moved in an axial direction in response to the hydrostatic pressures within the pressure chamber.

It is believed that the objects of the invention have been fully achieved by the construction disclosed. It must be understood that changes and modifications may be made without departing from the spirit of the invention as disclosed nor the scope thereof as defined in the appended claims.

What is claimed is:

1. A power washing centrifugal separator comprising a rotatable bowl having upper and lower bowl portions, each of said bowl portions having inner and outer inclined surfaces converging respectively at inner and outer maximum peripheries, an annular substantially continuous discharge orifice formed in said bowl adjacent its maximum periphery, an upwardly extending tubular member centrally connected to the upper bowl portion and having an inlet bore for the delivery of material to be separated to the interior of said bowl, a valve structure supported for rotation with said bowl, said valve structure comprising an annular shell having an inner surface inclined in the same general direction as the inclined outer surface of the upper bowl portion, a downwardly extending flange connected to the outer peripheral edge of said shell, said shell being axially spaced from the upper inclined surface of the upper bowl portion to provide a liquid receiving pressure chamber, said shell having a centrally disposed opening encircling the upwardly extending tubular member, an annular sealing element of rubber-like material connected to the inner inclined surface of the shell, said sealing element having a substantially flat lower surface normally seated over the discharge opening, the outer peripheral edges of said sealing element engaging the downwardly extending flange, the inner peripheral edge of said sealing element being of concave shape and having a relatively thin annular flexible web portion projecting inwardly toward the axis of the bowl, said outer inclined surface of said upper bowl portion including an annular recess, a spring member connected to said bowl, said spring member engaging said shell for urging the same in a first axial direction to compress the sealing element over the discharge opening during the normal separating operation of said bowl, and means for supplying washing liquid to said bowl and to said pressure chamber, said means including a tubular feed element in axial alignment with the inlet bore and having an opening of larger diameter than the diameter of the inlet bore, said annular web portion engaging the annular recess of the upper bowl portion in sealing relation during rotation of the bowl whereby the pressure in said pressure chamber effects axial movement of the shell in a second direction to displace the sealing element from the discharge opening to permit the discharge of washing liquid therethrough, and a bleeder orifice in communication with the pressure chamber, said orifice being adapted to continually discharge washing liquid therefrom during a washing operation.

2. A power washing centrifugal separator comprising a rotatable bowl having upper and lower bowl portions, each of said bowl portions having inner and outer inclined surfaces converging respectively at inner and outer maximum peripheries, an annular substantially continuous discharge orifice formed in said bowl adjacent its maximum periphery, an upwardly extending tubular member connected to the upper bowl portion and having an inlet bore for the delivery of material to be separated to the interior of said bowl, a valve structure supported for rotation with said bowl, said valve structure comprising an annular shell having an inner surface inclined in the same general direction as the inclined outer surface of the upper bowl portion, said shell being axially spaced from the upper inclined surface of the upper bowl portion to provide a liquid receiving pressure chamber, said shell having an opening encircling the upwardly extending tubular member, an annular sealing element of rubber-like material connected to the inner inclined surface of the shell, said sealing element having a substantially flat lower surface normally seated over the discharge opening, the inner peripheral edge of said sealing element being of concave shape and having a relatively thin annular flexible web portion projecting inwardly toward the axis of the bowl, said outer inclined surface of said upper bowl portion including an annular recess, a spring member connected to said bowl, said spring member engaging said shell for urging the same in a first axial direction to compress the sealing element over the discharge opening during the normal separating operation of said bowl, and means for supplying washing liquid to said bowl and to said pressure chamber, said means including a tubular feed element in axial alignment with the inlet bore and having an opening of larger diameter than the diameter of the inlet bore, said annular web portion engaging the annular recess of the upper bowl portion in sealing relation during rotation of the bowl whereby the pressure in said pressure chamber effects axial movement of the shell in a second direction to displace the sealing element from the discharge opening to permit the discharge of washing liquid therethrough, and a bleeder orifice in communication with the pressure chamber, said orifice being adapted to continually discharge washing liquid therefrom during a washing operation.

3. A power washing centrifugal separator comprising a rotatable bowl having upper and lower bowl portions, each of said bowl portions having inner and outer inclined surfaces converging respectively at inner and outer maximum peripheries, an annular substantially continuous discharge orifice formed in said bowl adjacent its maximum periphery, an upwardly extending tubular member connected to the upper bowl portion and having an inlet bore for the delivery of material to be separated to the interior of said bowl, a valve structure supported for rotation with said bowl, said valve structure comprising an annular shell having an inner surface inclined in the same general direction as the inclined outer surface of the upper bowl portion, said shell being axially spaced from the upper inclined surface of the upper bowl portion to provide a liquid receiving pressure chamber, said shell having an opening encircling the upwardly extending tubular member, an annular sealing element of rubber-like material connected to the inner inclined surface of the shell, said sealing element having a substantially flat lower surface normally seated over the discharge opening, the inner peripheral edge of said sealing element being of concave shape and having a relatively thin annular flexible web portion projecting inwardly toward the axis of the bowl, a spring member connected to said bowl, said spring member engaging said shell for urging the same in a first axial direction to compress the sealing element over the discharge opening during the normal separating operation of said bowl, and means for supplying washing liquid to said bowl and to said pressure chamber, said means including a tubular feed element in axial alignment with the inlet bore and having an opening of larger diameter than the diameter of the inlet bore, said annular web portion engaging the upper bowl portion in sealing relation during rotation of the bowl whereby the pressure in said pressure chamber effects axial movement of the shell in a second direction to displace the sealing element from the discharge opening to permit the discharge of washing liquid therethrough, and a bleeder orifice in communication with the pressure chamber, said orifice being adapted to continually discharge washing liquid therefrom during a washing operation.

4. A power washing centrifugal separator comprising a rotatable bowl having upper and lower bowl portions, each of said bowl portions having inner and outer inclined surfaces converging respectively at inner and outer maximum peripheries, an annular substantially continuous discharge orifice formed in said bowl adjacent its maximum periphery, an upwardly extending tubular member connected to the upper bowl portion and having an inlet bore for the delivery of material to be separated to the interior of said bowl, a valve structure supported for rotation with said bowl, said valve structure comprising an annular shell having an inner surface inclined in the same general direction as the inclined outer surface of the upper bowl portion, said shell being axially spaced from the upper inclined surface of the upper bowl portion to provide a liquid receiving pressure chamber, said shell having an opening encircling the upwardly extending tubular member, an annular sealing element of rubber-like material connected to the inner inclined surface of the shell, said sealing element having a substantially flat lower surface normally seated over the discharge opening, the inner peripheral edge of said sealing element being of concave shape and having a relatively thin annular flexible web portion projecting inwardly toward the axis of the bowl, a spring member connected to said bowl, said spring member engaging said shell for urging the same in a first axial direction to compress the sealing element over the discharge opening during the normal separating operation of said bowl, and means for supplying washing liquid to said bowl and to said pressure chamber, said means including a tubular feed element in axial alignment with the inlet bore and having an opening of larger diameter than the diameter of the inlet bore, said annular web portion engaging the upper bowl portion in sealing relation during rotation of the bowl whereby the pressure in said pressure chamber effects axial movement of the shell in a second direction to displace the sealing element from the discharge opening to permit the discharge of washing liquid therethrough.

5. A power washing centrifugal separator comprising a rotatable bowl having upper and lower bowl portions, said bowl portions having inner inclined surfaces converging at the maximum inner periphery of said bowl, an annular discharge orifice formed in said bowl adjacent its maximum inner periphery, an upwardly extending tubular element on said upper bowl portion, said tubular element having an inlet opening in communication with the interior of the bowl, a valve structure supported for rotation with said bowl, said valve structure comprising an annular shell having an inner surface spaced from the upper bowl portion to provide a pressure chamber, said shell having a centrally disposed opening encircling said tubular element to provide for the delivery of liquid to said pressure chamber, an annular rubber-like sealing element connected to the shell, said sealing element having a lower surface coextensive with and normally in sealing relation over said discharge orifice, the inner peripheral edge of said sealing element defining an annular concavity, a rubber-like annular web on said sealing element, said web projecting inwardly from the inner peripheral edge of said sealing element, and means for supplying washing liquid to said tubular element and to the opening of the shell whereby liquid is supplied to the bowl and to the pressure chamber, whereby the web of the sealing element engages the upper bowl portion in sealing relation and liquid pressure within the pressure chamber during rotation of the bowl moves the shell in an axial direction thereby displacing the sealing element from sealing relation with the discharge orifice whereby washing liquid in said bowl is discharged through said orifice.

6. A power washing centrifugal separator comprising a rotatable bowl having upper and lower bowl portions, said bowl portions having inner inclined surfaces converging at the maximum inner periphery of said bowl, an annular discharge orifice formed in said bowl adjacent its maximum inner periphery, an upwardly extending tubular element on said upper bowl portion, said tubular element having an inlet opening in communication with the interior of the bowl, a valve structure supported for rotation with said bowl, said valve structure comprising an annular shell having an inner surface spaced from the upper bowl portion to provide a pressure chamber, said shell having an opening to provide for the delivery of liquid to said pressure chamber, an annular rubber-like sealing element connected to the shell said sealing element having a lower surface coextensive with and normally in sealing relation over said discharge orifice, the inner peripheral edge of the said sealing element defining an annular concavity, a rubber-like annular web on said sealing element, said web projecting inwardly from the inner peripheral edge of said sealing element, and means for supplying washing liquid to the opening of the shell whereby liquid is supplied to the pressure chamber, whereby the web of the sealing element engages the upper bowl portion in sealing relation and liquid pressure within the pressure chamber during rotation of the bowl moves the shell in an axial direction thereby displacing the sealing element from sealing relation with the discharge orifice whereby washing liquid in said bowl is discharged through said orifice.

7. A rotatable liquid seal adapted to seal the discharge orifice of a centrifugal separator comprising an annular rubber-like member having oppositely disposed flat faces and inner and outer peripheral sides, the inner peripheral side of said rubber-like member being concave to provide an annular concavity, and a flexible annular web portion formed integrally with the member, the web being coextensive with said member and projecting inwardly from an edge adjacent said concavity of the inner peripheral side.

8. A rotatable liquid seal in accordance with claim 7, the flexible web being tapered to provide a feather edge at its innermost extremity.

9. A rotatable liquid seal in accordance with claim 7, one of said flat faces including a second concavity coextensive with said annular rubber-like member, said web being tapered to provide a feather edge at its innermost extremity, the web extending inwardly from an edge disposed between said concavities.

10. A power washing centrifugal separator comprising a rotatable bowl having upper and lower bowl portions, said bowl portions having inner and outer inclined surfaces converging at the maximum inner periphery of said bowl, said bowl having an annular discharge orifice adjacent its inner maximum periphery, said upper bowl portion having a centrally disposed first inlet opening in communication with the interior of said bowl, a liquid discharge nozzle positioned above said first inlet opening for directing washing liquid to the inlet opening, a valve structure supported for rotation with said bowl, said valve structure comprising an annular shell having an inner surface spaced from the upper bowl portion to provide a pressure chamber, said shell having a centrally disposed second inlet opening in communication with the pressure chamber, said second inlet opening being positioned to receive liquid from the liquid discharge nozzle, and an annular rubber-like sealing element connected to the inner surface of said shell for engaging and sealing said discharge orifice during one position of said shell with respect to said bowl portion, said shell and said sealing element being movable axially with respect to said bowl portion to a second position for opening said discharge orifice during the entrance of liquid into said pressure chamber.

HOWARD A. HECKENDORF.

References Cited in the file of this patent
UNITED STATES PATENTS

| Number | Name | Date |
|---|---|---|
| 1,735,692 | Nyrop | Nov. 12, 1929 |
| 2,178,547 | Bjornstjerna | Nov. 7, 1939 |